United States Patent [19]

Gorman et al.

[11] Patent Number: 4,938,942
[45] Date of Patent: Jul. 3, 1990

[54] CARBON GRAPHITE COMPONENT FOR AN ELECTROCHEMICAL CELL AND METHOD FOR MAKING THE COMPONENT

[75] Inventors: Michael E. Gorman, Suffield; Richard D. Breault, Coventry; John Donahue, Suffield; Sudhangshu Bose, Manchester, all of Conn.

[73] Assignee: International Fuel Cells, South Windsor, Conn.

[21] Appl. No.: 755,876

[22] Filed: Jul. 17, 1985

[51] Int. Cl.$^5$ .............................................. C01B 31/64
[52] U.S. Cl. .............................. 423/448; 423/447.9; 429/44; 264/29.5
[58] Field of Search ............... 429/44; 423/447.9, 448; 264/29.2, 29.5

[56] References Cited

U.S. PATENT DOCUMENTS

| | | | |
|---|---|---|---|
| 3,616,045 | 10/1971 | Kozar et al. | 264/29.5 |
| 3,639,140 | 2/1972 | Miyamichi | 423/447.9 |
| 3,649,196 | 3/1972 | Degginger | 23/209.4 |
| 3,726,737 | 4/1973 | Nishikawa | 423/447.9 |
| 4,041,116 | 8/1977 | Baud et al. | 264/29.5 |
| 4,064,207 | 12/1977 | DeCrescente et al. | 264/29.6 |
| 4,064,322 | 12/1977 | Bushnell et al. | 429/41 |
| 4,067,955 | 1/1978 | Noakes et al. | 264/29.5 |
| 4,080,413 | 3/1978 | Layden et al. | 264/29.2 |
| 4,115,528 | 9/1978 | Christner et al. | 423/449 |
| 4,165,349 | 8/1979 | Sandelli | 264/29.1 |
| 4,173,662 | 11/1979 | Stewart, Jr. | 427/115 |
| 4,185,131 | 1/1980 | Goller et al. | 427/113 |
| 4,185,145 | 1/1980 | Breault | 429/34 |
| 4,219,611 | 8/1980 | Breault | 429/13 |
| 4,226,816 | 10/1980 | Yamamoto et al. | 264/29.4 |
| 4,233,369 | 11/1980 | Breault et al. | 429/26 |
| 4,245,009 | 1/1981 | Guthrie | 429/16 |
| 4,259,389 | 3/1981 | Vine et al. | 428/192 |
| 4,269,642 | 5/1981 | DeCasperis et al. | 156/89 |
| 4,279,970 | 7/1981 | Breault et al. | 429/35 |
| 4,287,232 | 9/1981 | Goller et al. | 427/113 |
| 4,313,972 | 2/1982 | Goller et al. | 427/113 |
| 4,360,485 | 11/1982 | Emanuelson et al. | 264/29.5 |
| 4,365,008 | 12/1982 | DeCasperis et al. | 429/36 |
| 4,374,906 | 2/1983 | Breault et al. | 429/44 |
| 4,376,029 | 3/1983 | Joo et al. | 264/29.5 |
| 4,396,480 | 8/1983 | Hegedus et al. | 429/33 |
| 4,409,125 | 10/1983 | Nishimo et al. | 423/447.9 |
| 4,426,340 | 1/1984 | Goller et al. | 264/29.1 |
| 4,507,262 | 3/1985 | Karas et al. | 419/2 |

FOREIGN PATENT DOCUMENTS

| | | | |
|---|---|---|---|
| 0086884 | 8/1983 | European Pat. Off. | 429/44 |
| 0127887 | 12/1984 | European Pat. Off. | 264/29.5 |
| 0162976 | 12/1985 | European Pat. Off. | 264/29.2 |
| 59-187623 | 10/1984 | Japan | 264/29.4 |
| 429840 | 1/1935 | United Kingdom | 423/448 |
| 1289081 | 9/1972 | United Kingdom | 423/448 |
| 1431891 | 4/1976 | United Kingdom | 264/29.2 |

OTHER PUBLICATIONS

Modern Pulp and Paper Making, by John B. Calkin, Reinhold Publishing Corp., 1957, pp. 312 and 313.

*Primary Examiner*—John Doll
*Assistant Examiner*—Robert M. Kinemund
*Attorney, Agent, or Firm*—Gene D. Fleischhauer

[57] ABSTRACT

A method for making a carbon-graphite component, such as a fuel cell substrate, suited for use in an electrochemical cell includes forming a precursor sheet structure comprising a resin, fibers that are graphitizable, and an inorganic compound containing boron and oxygen. Various details of the method are developed that effect the carbon yield of cellulose fibers used for the precursor sheet and the thermal and the electrical conductivity of the component. In one embodiment, the inorganic compound of boron and oxygen is boric acid.

28 Claims, 2 Drawing Sheets

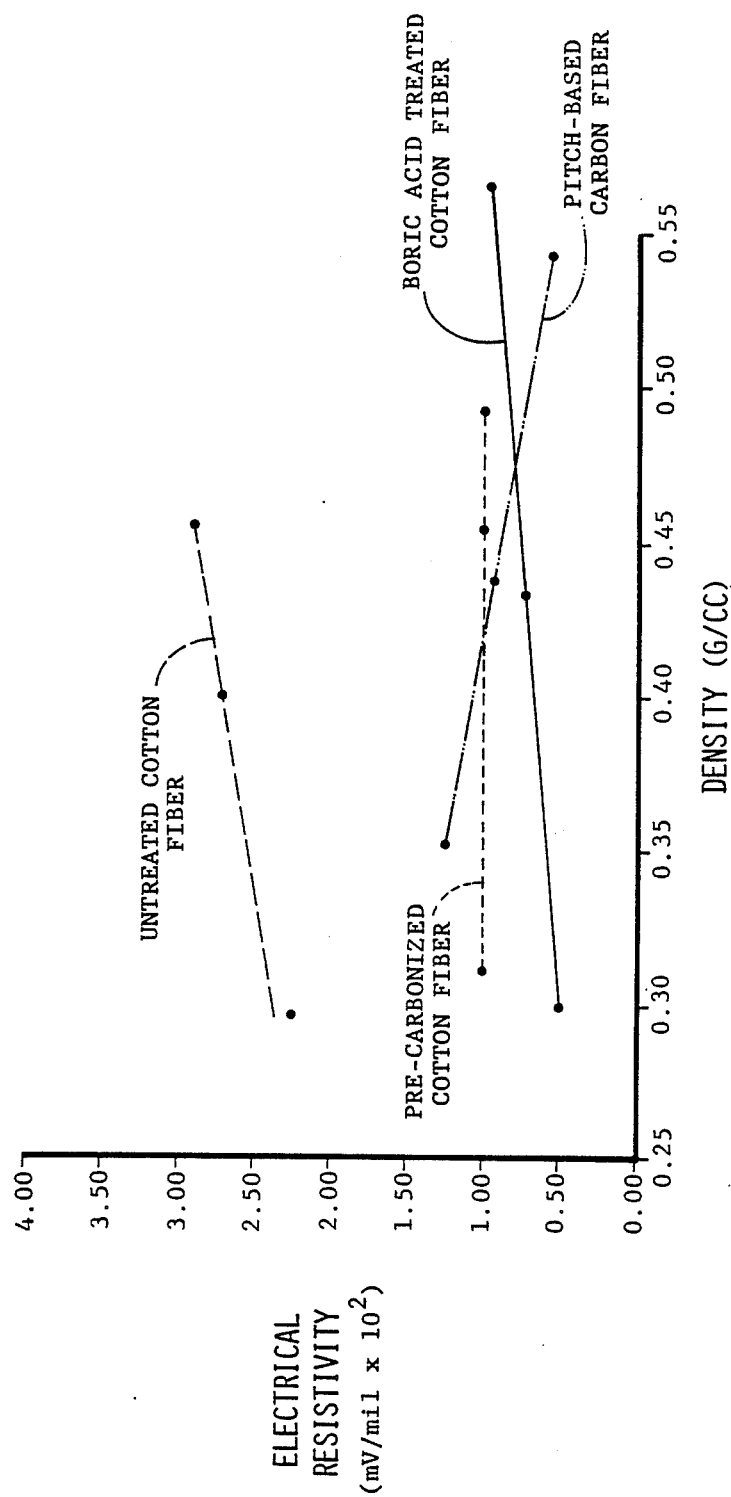

CARBON GRAPHITE COMPONENT FOR AN ELECTROCHEMICAL CELL AND METHOD FOR MAKING THE COMPONENT

Technical Field

This invention relates to carbon-graphite components of the type which are used in electrochemical cells, such as fuel cell powerplants. Although this invention was developed for use in the field of phosphoric acid fuel cell powerplants, the invention may have application to any field employing carbon-graphite components.

BACKGROUND OF THE INVENTION

Fuel cell powerplants produce electric power by electrochemically consuming a fuel and an oxidant in one or more electrochemical cells. The oxidant may be pure oxygen or a mixture of gases containing oxygen, such as air. The fuel may be hydrogen.

Each fuel cell generally has electrodes for receiving the gases, such as an anode electrode for fuel and a cathode electrode for an oxidant. The cathode electrode is spaced from the anode electrode and a matrix saturated with electrolyte is disposed between the electrodes.

Each electrode includes a substrate. The substrate has a catalyst layer disposed on the side of the substrate which faces the electrolyte matrix. In some instances, an electrolyte reservoir plate is on the other side of the substrate and is capable of providing electrolyte through small pores to the substrate. These electrolyte reservoir plates may have channels or passageways behind the substrate for carrying a reactant gas, such as gaseous fuel to the anode and gaseous oxidant to the cathode. For example, these channels might extend between parallel ribs on the substrate side of the electrolyte reservoir plate. A separator plate on the other side of the electrolyte reservoir plate provides a barrier to the loss of electrolyte and prevents mixing of the fuel and oxidant gases in adjacent cells. Another acceptable construction is to have the electrode substrate act both as an electrolyte reservoir plate and as an electrode substrate with channels on the separator side of the substrate.

Generally, a stack of fuel cells and separator plates are used in performing the electrochemical reaction. As a result of the electrochemical reaction, the fuel cell stack produces electric power, a reactant product, and waste heat. A cooling system extends through the stack for removing the waste heat from the fuel cell stack. The cooling system has a coolant and conduits for the coolant. The conduits are disposed in cooler holders to form coolers within the stack. Heat is transferred by the cooler holders from the fuel cells to the conduits and from the conduits to the coolant.

The cooler holder must be electrically and thermally conductive and may be permeable to gas. An example of such a cooler holder is shown in U.S. Pat. No. 4,245,009 issued to Guthrie entitled "Porous Coolant Tube Holder for Fuel Cell Stack". Alternatively, the cooler holder might be impermeable to gas. An example of such a cooler holder is shown in U.S. Pat. No. 3,990,913 issued to Tuschner entitled "Phosphoric Acid Heat Transfer Material". In Tuschner, the cooler holder serves the double function of cooler holder and separator plate.

Separator plates prevent the mixing of the fuel gas, such as hydrogen, disposed on one side of the plate, with an oxidant, such as air, disposed on the other side of the plate. Separator plates are, therefore, highly impermeable to gases such as hydrogen and highly electrically conductive to pass the electrical current through the fuel cell stack. In addition, separator plates must also tolerate the highly corrosive atmosphere formed by the electrolyte used in the fuel cell. One example of such an electrolyte is hot, phosphoric acid. In addition, separator plates, like cooler holders, must be strong, particularly in terms of flexural strength, which is a measure of the ability of the separator plate to withstand high pressure loads, differential thermal expansion of mating components, and numerous thermal cycles without cracking or breaking.

An example of a method for making separator plates for electochemical cells is discussed in U.S. Pat. No. 4,360,485 issued to Emanuelson et al., the disclosure in which is hereby incorporated by reference. In this method, the separator plate is formed by molding and then graphitizing a mixture of preferably 50 percent high purity graphite powder and 50 percent carbonizable thermosetting phenolic resin. In particular, Emanuelson discusses forming a well blended mixture of the appropriate resin and graphite powder. The mixture is then distributed in a mold. The mold is compacted under pressure and temperature to melt and partially cure the resin and to form the plate.

Electrolyte reservoir layers, such as are commonly found in electrolyte reservoir plates and as electrode substrates have requirements that differ from those for a separator plate. For example, reservoir layers must accommodate volume changes in the electrolyte during fuel cell operation. Examples of such electrolyte reservoir layers are shown in commonly owned U.S. Pat. Nos. 3,779,811; 3,905,832; 4,035,551; 4,038,463; 4,064,207; 4,080,413; 4,064,322; 4,185,145; and 4,374,906.

Several of these patents show the electrolyte reservoir layer as an electrode substrate. In addition to accommodating changes in acid volume due to electrolyte evaporation and changes in operating conditions of the cell electrode, substrates must satisfy several other functional requirements. For example, the substrate provides support to the catalyst layer and provides a means for the gaseous reactants to pass through the catalyst layer. The edges of the substrate are often required to function as a wet seal to prevent the escape of reactant gases and electrolyte from the cell. Finally, the substrate must be a good electrical conductor, a good thermal conductor and have adequate structural strength and corrosion resistance.

One material suggested for use in fuel cells, such as potassium hydroxide fuel cells, is discussed in commonly owned U.S. Pat. No. 4,064,207 issued to DeCrescente et al. entitled "Porous Carbon Fuel Cell Electrode Substrates and Method of Manufacture". DeCrescente suggests making the substrate from any inexpensive material available in filament form which can be pyrolized to form a carbon fiber. Examples of such filaments are filaments comprised of acrylonitrile polymers and filaments comprised of naturally occurring cellulosic fibers such as rayon. The carbonizable filaments are uniformly distributed on a planar support to felt the fibers. A resin binder is thereafter applied typically by spraying. Thereafter, the felt is subjected to pyrolysis by heating.

Another material commonly used as a reservoir layer in phosphoric acid electrolyte fuel cells is formed of carbon fibers bonded together with a resin such as a phenolic resin and heated to convert the resin and carbon fibers to graphite. Alternatively, carbon or graphite fibers may be bonded together with pyrolitic graphite by placing an amount of fibers in a decomposable hydrocarbon atmosphere (e.g., methane) under conditions which cause the hydrocarbon to break down into carbon and hydrogen. The carbon (now pyrolitic graphite) deposits on the fibers. These two materials are available commerically and are commonly referred to as carbon papers.

Although many precursor materials have been proposed for carbon fibers, only three, rayon, polyacrylonitrile (PAN), and pitch are used in commercial production. Such carbon fibers are flexible, lightweight, thermally and, to a large extent, chemically inert. These fibers are all considered to be good thermal and electrical conductors.

Low cost cellulose fibers, such as cotton fibers and wood fibers, are an attractive precursor material for carbon fibers. However, gas permeable components, such as fuel cell substrates, made from cellulose based carbon fibers have had lower electrical and thermal conductivities than electrode substrates made from pitch based carbon fibers. The lower electrical conductivity increases electrical resistance and causes an increase in fuel cell area to produce the same electrical power as smaller fuel cells manufactured from higher conductivity, pitch based carbon fibers. The lower thermal conductivity of fuel cell stacks containing cellulose based carbon fibers requires more coolers per fuel cell stack than fuel cell stacks made with pitch based precursor fibers. Finally, the carbon yield of cellulose fibers is greatly reduced by rapid heating rates of the fiber (greater than one-hundred degrees Fahrenheit per minute) requiring processing of these fibers at slower, less economical rates if a higher carbon yield is desired. As a result, fuel cell stacks using components made from cellulose based carbon fibers can cost more for a given amount of electrical power than fuel cell powerplants made from the more expensive pitch based fibers having higher electrical and thermal conductivities.

Accordingly, scientists and engineers are seeking to develop methods for making gas permeable fuel cell components, such as electrode substrates and carbon fibers for such components from cellulose precursor fibers at higher heating rates and with improved electrical and thermal properties.

DISCLOSURE OF INVENTION

According to the present invention, a carbon-graphite component suited for use in an electrochemical cell is formed from a carbonizable, thermosetting resin, an inorganic compound containing boron and oxygen, and precursor fibers selected from the group consisting of cellulose fibers, carbonized cellulose fibers and mixtures thereof.

In accordance with one embodiment of the present invention, the method for making the carbon-graphite component includes the step of mixing the inorganic compound containing boron and oxygen with the fibers and the resin prior to curing the resin.

A primary feature of the present invention is a method for making a carbon-graphite component suited for use in an electrochemical cell which includes the step of mixing an inorganic compound containing boron and oxygen with cellulose fibers or carbonized cellulose fibers or mixtures of cellulose fibers and carbonized cellulose fibers. In one embodiment, mixing of the resin, cellulose fibers and inorganic compound takes place before curing the resin. The inorganic compound is boric acid in an amount sufficient to increase thermal conductivity and decrease electrical resistivity of the resulting component as compared with components formed from the same fiber without using boric acid. In one embodiment, an amount of silicic acid is mixed with the boric acid.

A primary advantage of the present invention is the power output of a fuel cell having components formed from cellulose based carbon fibers which results from the electrical resistivity and thermal conductivity of the components as compared to a fuel cell of the same size having components made from carbonized cellulose fibers without the use of inorganic compounds containing boron and oxygen. Another advantage is the period of time required to form the component which results from obtaining a carbon yield which is greater than twenty percent by weight of the cellulose fiber at heating rates which exceed one-hundred degrees Fahrenheit per minute during the carbonization process. Still another advantage is the ability to change the mean pore size of an electrolyte reservoir layer by changing the sequence of processing the cotton fiber into a carbonized fiber.

The foregoing features and advantages of the present invention will become more apparent in light of the following detailed description of the best mode for carrying out the invention and in the accompanying drawings.

BRIEF DESCRIPTION OF THE DRAWING

FIG. 2 is a graphical representation of the resistivity of a substrate in millivolts per thousandth of an inch (mV/mil) at a current density of one-hundred amps per square foot and under an axial load of one-hundred pounds per square inch.

BEST MODE FOR CARRYING OUT THE INVENTION

Figure 1:
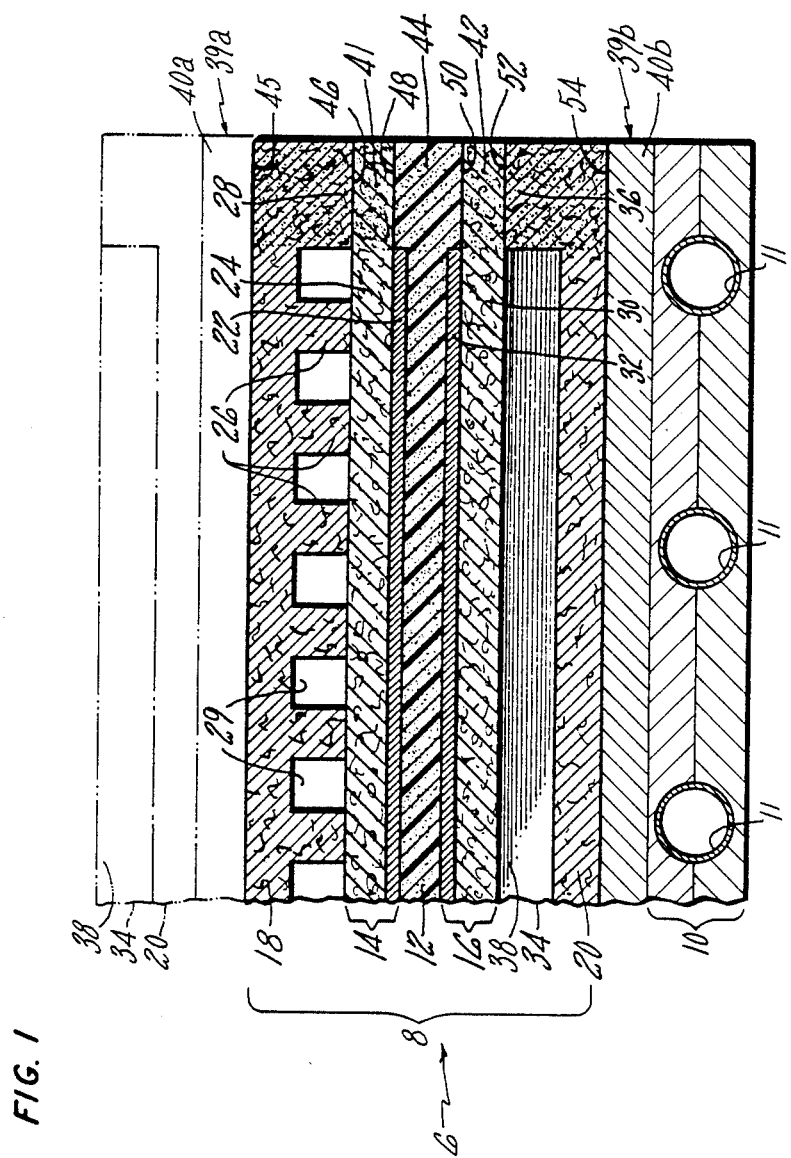
FIG. 1 is a cross sectional view of a portion of an electrochemical cell stack having an electrolyte reservoir layer and a separator plate adjacent to a cooler holder.

FIG. 1 is a cross-sectional view of a portion of a fuel cell stack 6. The fuel cell stack includes one or more fuel cells as represented by the fuel cell 8 and cooler holders, as represented by the single cooler holder 10, which are spaced at intervals between sets of fuel cells. The cooler holders are adapted to receive conduits 11 for a coolant.

Each fuel cell includes an electrolyte retaining matrix 12 disposed between an anode electrode 14 and a cathode electrode 16. The particular cell shown uses phosphoric acid as the electrolyte. An electrolyte reservoir plate 18 is adjacent the anode and an electrolyte reservoir plate 20 is adjacent the cathode. In an alternate construction, the electrolyte reservoir plates might be replaced by ribbed gas separator plates.

The anode electrode 14 has a catalyst layer 22 and a porous reservoir layer 24. The catalyst layer is bonded to the reservoir layer and is formed of catalyst particles bonded together with a hydrophobic material such as polytetrafluoroethylene. One such catalyst is platinum supported on carbon particles. The reservoir layer in this embodiment is also an electrode substrate since it supports the catalyst layer.

The porous electrolyte reservoir plate 18 has ribs 26 and an edge portion 28. The ribs are spaced apart leaving passages 29 for fuel therebetween. A suitable fuel, such as hydrogen, is flowed through the passages 29 between the reservoir layer and the electrolyte reservoir plate and thence to the catalyst layer 22.

Electrolyte movement within the cell occurs as a result of the capillarity of porous structures which develop capillary forces. The smaller the pore, the larger the capillary force and the greater the liquid retention capability. Electrolyte transfer between the matrix 12 and both the electrolyte reservoir plate 18 and reservoir layer 24 occurs directly through the pores of the catalyst layer 22 which is partially hydrophilic. The catalyst layer may have holes to aid in this liquid transfer.

In this example of a fuel cell, the cathode electrode 16 also has a reservoir layer 30 and a catalyst layer 32. The catalyst layer is bonded to the reservoir layer. In many applications, a reservoir layer may be provided on only one side of the cell.

Like the electrolyte reservoir plate 18 adjacent the anode, the electrolyte reservoir plate 20 adjacent the cathode has a plurality of ribs, as represented by the single rib 34, which are spaced apart to define passages 38 for the oxidant. These passages generally extend perpendicular to the passages 29. An oxidant, such as the oxygen contained in air, is flowed through these passages between the reservoir layer and the electrolyte reservoir plate and thence through the reservoir layer to the catalyst layer.

Separator plate 39a having an edge portion 40a and separator plate 39b having an edge portion 40b are used to separate the adjacent fuel cells. The separator plates prevent the hydrogen, which is flowed along passages 29, from mixing with the oxygen in air flowed along passages 38. The separator plates are highly impermeable to a gas such as hydrogen and highly electrical conductive to enable electron flow longitudinally through the stack. The separator plates also block the transfer of electrolyte from reservoir layers within the cell.

In this example, the reservoir layers each have a peripheral sealing portion. For example, the reservoir layer 24 has a peripheral sealing portion 41, the reservoir layer 30 has a peripheral sealing portion 42 and the edge regions 28 and 36 of the electrolyte reservoir plates are peripheral sealing portions. These sealing portions are impregnated, such as with material of which the matrix 12 is made, in order that the entire volume of these portions remain essentially completely filled with electrolyte as long as the matrix 12 is filled with electrolyte. Liquid seals are thereby formed by sandwiching the sealing portions between the edge portion 40a of the upper gas separator plate and the edge portion 40b of the lower gas separator plate. These liquid seals are formed at the surfaces 45, 46, 48, 50, 52, and 54. This may be done in the manner described in U.S. Pat. No. 3,867,206 entitled "Wet Seal for Liquid Electrolyte Fuel Cells" issued to Trocciola et al. which is commonly owned with the present invention.

As shown, the components which form the electrochemical cell are plate-like structures which are molded or shaped to configurations which adapt them to their particular use.

Electrode substrates manufactured from carbonized cellulose fibers were made from mixtures of fibers, both carbonized and uncarbonized, a thermosetting resin and certain compounds added during different steps in the process of manufacture. The steps of the process included forming a precursor sheet structure containing the fibers and resin, heating the precursor sheet structure in a non-oxidizing atmosphere to a first temperature range for carbonizing portions of the sheet structure and heating the precursor sheet structure in a non-oxidizing atmosphere to a second temperature range to graphitize the carbonized portions. Generally, carbonization took place in a non-oxidizing atmosphere (such as an inert or reducing atmosphere) at a temperature below approximately four-thousand five hundred degrees Fahrenheit (4500° F.) and graphitization at a temperature above approximately four-thousand five hundred degrees Fahrenheit (4500° F.) as discussed at page 361, volume 6 of the McGraw-Hill Encyclopedia of Science and Technology (5th Ed. 1982), the disclosure of which is incorporated herein by reference. These substrates are discussed in the following examples.

EXAMPLE 1

A series of experiments were made to evaluate the effect of various additive compounds on the physical properties of substrates made from cotton. In this particular example, the cotton fibers were bleached cotton linters. The cotton fibers had an average diameter of 9-10 microns and a nominal length of 0.010 inch after chopping the fibers in a Wiley mill. The carbonizable, thermosetting phenolic resin was Reichhold EX4347 phenolic resin available from Varcum Chemical, a Division of Reichhold Chemicals, Inc., Niagara Falls, N.Y. The carbonizable, thermosetting phenolic resin was Reichhold EX4347 phenolic resin available from Varcum Chemical, a Division of Reichhold Chemicals, Inc., Niaqara Falls, N.Y. The additive compounds were an inorganic compound containing boron and oxygen, such as boric acid ($H_3BO_3$ powder, reagent grade), silicic acid ($H_2SiO_3$ power, reagent grade), iron powder (Fe), and silicon carbide particles (SiC). These additive compounds were incorporated into a two-to-one, cellulose-to-phenolic resin mixture by mechanical dry blending prior to formation of the substrate. In this example and in other examples, the presence of each additive compound is listed below in weight percent of the weight of the total mixture of cellulose, phenolic resin and the additive compound or compounds.

The mixture was molded into a substrate, 100 mils thick and thermoset by heating the mixture in a mold in the presence of air to a temperature of about three hundred and twenty degrees Fahrenheit (320° F.). After molding, the molded precursor sheet was heated in a non-oxidizing atmosphere, in particular, an inert nitrogen atmosphere, to about eighteen hundred degrees Fahrenheit (1800° F.) at a rate of about eight degrees Fahrenheit per hour (8° F./hr.) to carbonize the cellulose and resin. As is well known, the carbonization may take place in a range of temperatures and at times which are determined as a function of the temperature. Although no samples were fabricated in a reducing atmosphere, it is believed that a reducing atmosphere would give the same results. The mixture was then heated in a non-oxidizing atmosphere, in particular, an inert argon-helium atmosphere, to about five thousand degrees Fahrenheit (5000° F.) in an Astro laboratory graphitizing furnace manufactured by the Astro Corporation. It is believed that a reducing atmosphere would give the same results. Table I compares the physical characteristics of these substrates to an untreated substrate made of the same cotton fiber. Electrical resistivity was measured in millivolts per thousandth of an inch (mV/mil) at a current density of one-hundred amps per square foot and under an axial load of one-hundred pounds per square inch.

Table II compares the physical characteristics of substrates receiving boric acid before the resin cure and substrates receiving boric acid after the resin cure.

TABLE II

| | $H_3BO_3$ Addition | $H_3BO_3$ Additive in Mixture (by weight) | Bulk Density (g/cc) | Thermal Conductivity (Btu/hr Ft °F.) | Electrical Resistivity at 100 ASF and 100 psi (mv/mil × $10^2$) | % Weight Loss | % Volume Change |
|---|---|---|---|---|---|---|---|
| 1. | Before Resin Cure | 3.1% | 0.45 | 2.0 | .75 | 58 | 45 |
| 2. | After Resin Cure | 2.0% | 0.50 | 0.4 | 2.30 | 61 | 56 |
| 3. | After Resin Cure | 4.9% | 0.52 | 0.4 | 1.75 | 59 | 55 |
| 4. | After Resin Cure | 15.4% | 0.57 | 1.1 | 1.35 | 62 | 57 |

TABLE I

| Additive Compound | Additive in Mixture (by weight) | Bulk Density (g/cc) | Thermal Conductivity (Btu/hr Ft °F.) | Electrical Resistivity at 100 ASF and 100 psi (mv/mil × $10^2$) | % Weight Loss | % Volume Change |
|---|---|---|---|---|---|---|
| 1. None | — | 0.40 | 0.75 | 2.7 | 67 | 59 |
| 2. $H_3BO_3$ | 2–7% | 0.45 | 1.7–2.0 | 0.75–1.0 | 58 | 45 |
| 3. $H_2SiO_3$ | 10–20% | 0.30 | 1.0–1.4 | 0.9–1.0 | 84 | 70 |
| 4. Fe | 7% | 0.45 | 1.9 | 0.9–1.0 | 79 | 72 |
| 5. SiC | 10% | 0.45 | 1.9 | 1.0–1.3 | 65 | 53 |

From this data it is clear that substrates formed with these additives have a significantly lower electrical resistivity and a higher thermal conductivity than substrates formed with untreated cotton which was carbonized and graphitized by the same method. Boric acid is the preferred additive of those investigated. In particular, the boric acid required a smaller weight percent to achieve at least the same effect and suffered a smaller weight loss and volume change. It is believed that total additives should not exceed twenty percent by weight of the total weight of the mixture and that amounts of boric acid between two and fifteen percent give satisfactory results.

EXAMPLE 2

A second series of experiments were made to determine whether curing the phenolic resin prior to the addition of the inorganic boron-oxygen compound would effect the improvement in properties. In this example, the cotton fibers were bleached cotton linters and were prepared in the same manner as Example 1. The cotton fibers were dry blended with 3.1% powdered boric acid for approximately one half hour. After blending together the powdered boric acid and the cotton fibers, the same powdered phenolic resin was added in an amount which created a two-to-one cellulose-to-phenolic resin mixture. The mixture was then molded into substrates as described in Example 1.

Another set of substrates was formed without adding of boric acid prior to curing of the resin. After curing the resin to form the precursor sheet, boric acid was added to the precursor sheet. The boric acid was added using a solvent impregnation scheme with methanol as the solvent for boric acid. Substrates having three different loadings of boric acid were prepared.

This data makes clear that adding boric acid prior to curing the resin results in significantly better thermal and electrical conductivities than adding boric acid curing after the resin. Nevertheless, adding boric acid after the resin cure did improve both thermal conductivity and electrical resistivity.

It is believed that mixing the boric acid with both the uncured phenolic resin and the cotton fibers allows the boric acid more evenly disperse in the resin and allows the boric acid to more evenly coat the cellulose fiber. If the resin is cured prior to adding the boric acid, the resin phase in the preformed sheet may coat the fiber and thus block access of the boric acid to the fiber. In addition, the boric acid does not easily disperse through the resin once the resin has fused and thermoset in its low surface are phase.

EXAMPLE 3

Further experiments were made to determine the effect on thermal conductivity and electrical resistivity of carbonizing the chopped cotton fibers (in this case, cotton flock) prior to mixing the cotton fibers with the uncured resin and with the uncured resin and the additive.

In experiment 1, uncarbonized cotton fibers were mixed with phenolic resin in a two-to-one ratio with no additive and molded, thermoset, carbonized, and graphitized as set forth in Example 1.

In parallel experiments 2, 3 and 4, the same type of cotton fibers were carbonized by heating the fibers in an inert atmosphere (in particular, a nitrogen atmosphere) to eighteen hundred degrees Fahrenheit (1800° F.) at a rate of eight degrees Fahrenheit per hour (8° F./hr.). The carbon yield of the fibers was twenty-three percent by weight of the starting fibers. In the parallel experiments, these carbonized fibers were mixed with phenolic resin in a ratio of two-to-one with no additives (experiment 2), with an amount of boric acid which was 3.1% by weight of the total mixture (experiment 3), and with an amount of boric acid and silicic acid in which the boric acid was five percent by weight of the total mixture and the silicic acid was one percent by weight of the total mixture (experiment 4).

The mixtures of cotton fibers, uncured phenolic resin and additive compounds as appropriate were molded into substrates and thermoset as set forth in Example 1. The mixtures were then carbonized and graphitized as set forth in Example 1. Table III compares the physical characteristics of the four substrates.

TABLE III

| | Additive in Mixture (by weight) | Fiber Mixed With Uncured Resin | Bulk Density (g/cc) | Thermal Conductivity (Btu/hr Ft °F.) | Electrical Resistivity at 100 ASF and 100 psi (mv/mil × $10^2$) | % Weight Loss | % Volume Change |
|---|---|---|---|---|---|---|---|
| 1. | None | Uncarbonized Cotton | 0.46 | 0.85 | 1.74 | 69 | 58 |
| 2. | None | Carbonized Cotton | 0.46 | 2.30 | 1.00 | 27 | 10 |
| 3. | 3.1% $H_3BO_3$ | Carbonized Cotton | 0.45 | 2.75 | 0.60 | 27 | 9 |
| 4. | 5% $H_3BO_3$, 1% $H_2SiO_3$ | Carbonized Cotton | 0.40 | 3.2 | 0.50 | 43 | 21 |

Experiments 1 and 2 make clear for precursor sheets made with no additives and from uncarbonized and carbonized cotton that carbonizing the cotton fiber prior to forming the precursor sheet structure (and, of course, prior to curing the carbonizable resin) improve the thermal conductivity and the electrical resistivity of the substrate.

As shown by experiment 3, adding 3.1% by weight boric acid to the carbonized cotton further improves thermal conductivity and electrical resistivity. Thus, carbonizing the cotton fibers prior to forming the sheet structure improved the thermal conductivity and electrical resisitivity whether or not the boric acid additive was present. But, carbonizing the cotton and mixing the carbonized cotton with uncured resin and boric acid is superior to mixing uncarbonized cotton with uncured resin and boric acid as shown by comparing this experiment and experiment 2 of Example 1 where uncarbonized cotton and boric acid was used to form the substrate.

Surprisingly, adding an amount of boric acid and silicic acid in an amount of about 20% by weight of the boric acid further increased thermal conductivity and electrical resistivity as shown by the fourth experiment of Example 3. It is thought that the silicic acid should be present in an amount which is about twenty percent by weight of the boric acid, with the preferred range being fifteen to twenty-five percent by weight of the amount of boric acid.

Using cellulose fibers and carbonized cellulose fibers had another surprising effect. In the past, the pore size of electrolyte resevoir layers, typically made from graphite powder, was controlled by controlling the particle size of the graphite powder and other organic additives. It was not thought possible to significantly vary the pore size of a substrate made from cotton, since cotton has a relatively constant and narrow fiber diameter range. The experiments set forth above demonstrated that the mean pore size of the substrates made from the uncarbonized cotton fiber mixed with the uncured resin was 15.5 microns versus a mean pore size of 10.1 microns for substrates made from carbonized cotton. Accordingly, the sequence of processing the cotton fiber into a substrate affects the mean pore size of the finished substrate and provides another variable for achieving the desired pore size. It is thought that mixing cotton fibers with carbonized fibers will permit varying the mean pore size between the mean pore size for the uncarbonized cotton and the mean pore size for the carbonized cotton.

EXAMPLE 4

Substrates for a two inch by two inch fuel cell test were prepared by carbonizing cotton flock, then dry blending the carbonized fiber with 3.1% boric acid and subsequently mixing the fiber and boric acid with phenolic resin as set forth in Example 3. After the mix was molded into a hand sheet (four inch by four inch sheet) the precursor sheet structure was heated in air to a temperature of three hundred and twenty-five degrees Fahrenheit (325° F.) to thermoset the resin. The precursor sheet structure was then heated to carbonize and then graphitize the sheet structure as set forth in Example 1. These parts were ribbed following carbonization and graphitization in a manner as set forth in commonly owned U.S. Pat. No. 4,115,627 entitled "Electrochemical Cell Comprising Ribbed Electrode Substrate", issued to Christner and Nagel and U.S. Pat. No. 4,269,642 entitled "Method of Forming Densified Edge Seals for Fuel Cell Components", issued to DeCasperis, Roethlein, and Breault, the disclosures of which are herein incorporated by reference. The substrates were catalyzed to serve as electrodes in the two inch by two inch fuel cell. The anode of the cell contained 0.25 milligrams of platinum per square centimeter, a ten percent by weight platinum -Vulcan catalyst, a teflon content of fifty weight percent, and a 1 mil thick silicon carbide matrix. The cathode contained one half of a milligram per square centimeter of a platinum alloy catalyst, a teflon content of thirty-five percent by weight, and a 1 mil thick silicon carbide matrix. The performance of this fuel cell was 0.671 millivolts at 200 amps per square foot and 720 hours on a standard hydrogen fuel and air. Performance of this cell is compared to a typical cell whose substrates were made by a similar method from pitch based carbon fibers and the same phenolic resin. These results are set forth in Table IV. The fuel cell electrolyte was 100% phosphoric acid, operating pressure was 14.7 psia. The standard hydrogen fuel was 70% hydrogen, 1% carbon monoxide and the balance carbon dioxide by volume percent.

A comparison of physical properties for the precarbonized, boric acid treated cellulose substrate and pitch based fiber substrate is shown in Table V.

TABLE IV

| Material | Cell Voltage mv × 10³ at 200 ASF | Internal Resistance (mV/cell) | Gain O₂ Gain | Air Limiting Current | O₂ Util. | H₂ Util. |
|---|---|---|---|---|---|---|
| Pre-Carbonized Boric Acid Treated Cotton (Thin Matrix) | 671 @ 720 hrs. | 12 MV | 77 @ 88 hrs. | 1985 @ 96 hrs. | 50% | 85% |
| Pitch Fiber Substrate (Thin Matrix) | 675 @ 682 hrs. | 12 MV | 79 @ 123 hrs. | 1798 @ 176 hrs. | 50% | 85% |

TABLE V

| Sample | Bulk Density (g/cc) | Thermal Conductivity (Btu/hr Ft °F.) | Electrical Resistivity at 100 ASF and 100 psi (mv/mil × 10²) | % Weight Loss | % Volume Change | Corrosion Potential (mv) |
|---|---|---|---|---|---|---|
| 1. Pre-Carbonized H₃BO₃ Treated Cotton Flock Substrate | 0.50 | 2.7 | 0.6 | 23 | 14 | 1140 |
| 2. Pitch Based Carbon Fiber Substrate | 0.50 | 2.2 | 0.7 | 20 | 15 | 1170 |

Clearly, the precarbonized cotton flock with boric acid gives at least equivalent performance to the pitch base fiber substrate and yet has the advantages of using cotton for the precursor material as discussed above.

Substrates manufactured from pitch based fibers and pan based fibers differ in appearance from substrates manufactured from cellulose fibers, such as cotton fibers and wood fibers. The cellulose and wood fibers are annular structures which when detached from the living plant will almost completely collapse to nearly retangular structures. Photomicrographs of substrates show the carbonized fibers to have a nominal width to thickness ratio which is greater than 3.0 for cotton and greater than 8.0 for wood. As will be realized under some conditions, a portion of the fiber may not collapse, but this will not change the overall appearance of the substrate in photomicrograph as being made of convoluted, ribbon-like fibers.

In contrast, pitch based fibers are solid, are intertwined and present the appearance of twisted and bent cylinders. The pitch based and pan based fibers also have a shinier appearance than the more dull cellulose based fibers. Thus, substrates which are made from pitch and pan based fibers are readily differentiated in appearance from those made from cellulose fibers.

The bulk density for substrates, like most electrolyte reservoir layers, ranges between about 0.25 grams and 0.65 grams per cubic centimeter to insure that an adequate porosity exists within the layer. Thus, as more permeable substrates become desirable, the bulk density will decrease.

As shown in FIG. 2, which is a graphical representation of resistivity versus bulk density for substrates made from pitch and pan based fibers and substrates made from carbonized cellulose fibers, the electrical resistivity of pitch and pan based fibers increases as bulk density decreases. Suprisingly, the electrical resistivity of cellulose fibers either decreases or is independent of bulk density. As a result, the resistivity for cellulose precursor fibers treated with inorganic compounds or boron and oxygen, such as boric acid, will become even less as the porosity increases (and the bulk density decreases). Thus, in components having a bulk density which is less than 0.55 grams per cubic centimeter, the reservoir layer will have an electrical resistivity which is less than six thousandths of a millivolts per mil ($0.6 \times 10^{-2}$ mV/mil).

EXAMPLE 5

In parallel experiments to those made in Example 3, cotton fibers were carbonized to determine the carbon yield. Typically, the carbon yield of cotton fibers is low in comparison to pitch base fibers. Typical yields are twenty to twenty-five percent by weight of the starting fiber for cotton carbonized to eighteen hundred an fifty degrees Fahrenheit (1850° F.) at a rate of eight degrees Fahrenheit per hour (commonly called the ramp rate, 8° F./hr.). This ramp rate is not practical for large scale production using continuous commercial furnaces. For economical operation, ramp rates of greater than a hundred degrees Fahrenheit (100° F.) and in the range of a hundred about one-hundred to four hundred degrees Fahrenheit per minute are required to maintain reasonable equipment size. The carbon yield for cotton fibers carbonized at a hundred-twenty degrees Fahrenheit per minute (120° F./min.) to eighteen hundred and fifty degrees Fahrenheit (1,850° F.) ranges from seven to fifteen percent depending on which cotton fiber is used. This reduced carbon yield is not acceptable for large scale production.

During a series of parallel experiments, the carbon yield at high ramp rates (one hundred to one hundred and fifty degrees Fahrenheit per minute) was significantly improved by mixing boric acid (powder-up about to fifteen percent by weight of the fibers) with the fibers prior to heating the fibers in an inert nitrogen atmosphere. No other particular steps were taken to treat the as received cellulose fibers.

In a second experiment, another portion of the as received fibers were impregnated with a flame retardant having an organic boron and oxygen compound base (boric acid) through the use of an aqueous-based composition. Aqueous-based composition suited for application to cellulose substrates are generally multi-component compositions comprising a surfactant, a moistening agent and combinations of various soluble salts such as ammonium sulfate, ammonium phosphate, ammonium sulfamate, borax, and of course, boric acid.

One aqueous-based flame retardant containing boric acid and known to be effective is Kelsul-FR-502 available from Kelsul, Inc., 3205 Foxgrove Lane, Chesapeake, Va.

Table VI summarizes the results of carbon yields at two different ramp rates to eighteen hundred and fifty degrees Fahrenheit for untreated cotton fiber (experiment 1), cotton fiber treated with boric acid in powder form (about ten percent by weight of the cotton fibers), and cotton fiber treated with a flame retardant such as Kelsul-FR-502 which was also present in an amount of about ten percent by weight of the cellulose fibers.

TABLE VI

| Sample | Carbon Yield at 120° F./minute to 1850° F. | Carbon Yield at at 8° F./hr. to 1850° F. |
|---|---|---|
| Untreated Cotton Fiber | 14% | 21%-23% |
| Boric Acid Treated Cotton Fiber | 21% | 23% |
| Boric Acid, Base Flame Retardant Treated Cotton Fiber (Kelsul FR-502) | 30% | 32% |

As shown, the carbon yield for the boric acid treated fibers at the high ramp rate is nearly the same as or greater than the carbon yield at the low ramp rate. The carbon yield for the treated fibers is increased in comparison to the carbon yield for untreated cotton fibers in both cases at both ramp rates most importantly, the carbon yield at the high ramp rate is at least equal to the carbon yield at the low ramp rate for the untreated fiber. This allows rapid heating of the carbon fiber in the critical region between four hundred degrees Fahrenheit and one thousand degrees Fahrenheit when most of the volatiles are driven off from the cellulose fiber at average rates during this period which may range between one hundred degrees of Fahrenheit per minute and two hundred degrees Fahrenheit per minute (and even greater) with satisfactory carbon yields.

It should be understood that the invention is not limited to the particular embodiments shown and described herein, but that various changes and modifications may be made without departing from the spirit and scope of this novel concept as defined by the following claims.

We claim:

1. A method for making a carbon-graphite component suited for use in an electrochemical cell, comprising:
   forming a precursor sheet structure comprising an inorganic compound containing boron and oxygen, a carbonizable, thermosetting resin and fibers selected from the group consisting of cellulose fibers, carbonized cellulose fibers and mixtures thereof;
   heating the sheet structure in a non-oxidizing atmosphere to a first temperature range which carbonizes cellulose fibers and the thermosetting resin wherein the carbonized resin bonds the carbonized cellulose fibers together;
   heating the sheet structure in a non-oxidizing atmosphere to a second, higher temperature range to increase the degree of graphitization of the carbonized cellulose fibers and resin.

2. The method for making a carbon-graphite component of claim 1 wherein the step of forming the precursor sheet structure includes the step of forming a mixture which comprises an inorganic compound containing boron and oxygen, an uncured, carbonizable, thermosetting resin and fibers selected from the group consisting of cellulose fibers, carbonized cellulose fibers and mixtures thereof and forming the precursor sheet structure from said mixture.

3. The method for making a carbon-graphite component of claim 2 wherein said thermosetting resin is a phenolic resin and the step of forming a precursor sheet structure includes the step of curing the thermosetting resin by heating the precursor sheet structure in an oxidizing atmosphere to a temperature which is less than the first temperature range and holding the mixture at said lesser temperature until the thermosetting resin is cured.

4. The method for making a carbon-graphite component of claim 3 wherein the fiber is selected from the group consisting of cotton fibers, carbonized cotton fibers and mixtures thereof.

5. The method for making the carbon-graphite component of claim 1 wherein the non-oxidizing atmosphere for heating the sheet structure to the first temperature range is nitrogen.

6. The method for making a carbon-graphite component of claim 4 wherein the method further includes the step of adding an amount of an inorganic compound of boron and oxygen to the precursor sheet structure after heating the precursor sheet structure to said first temperature range and prior to heating the precursor sheet structure to said second temperature range.

7. The method for making a carbon-graphite component of claim 2, claim 3, claim 4 or claim 5 wherein the inorganic compound of boron and oxygen is boric acid.

8. The method for making a carbon-graphite component of claim 2, claim 3, claim 4 or claim 5 wherein the uncarbonized fiber is heated to the first temperature range at a rate which exceeds one-hundred degrees Fahrenheit per minute and provides a carbon yield which is greater than twenty percent by weight of the uncarbonized fiber.

9. The method for forming the carbon-graphite component of claim 8 wherein the mixture consists essentially of said fibers, said resin, and two percent to fifteen percent by weight of a flame retardant comprising said boric acid and a salt selected from the group consisting of ammonuim sulfate, ammonuim phosphate, ammonium sulfamate, borax and mixtures thereof.

10. The method for making a carbon-graphite component of claim 7 wherein the mixture comprises said resin, said fibers and two percent to fifteen percent by weight boric acid.

11. The method for making a carbon-graphite component of claim 10 wherein the mixture consists essentially of said resin, said fibers, said boric acid and silicic acid.

12. The method for making a carbon-graphite component of claim 11 wherein the silicic acid is present in an amount which is about fifteen percent to twenty-five percent by weight of the weight of the amount of said boric acid.

13. The method of making a carbon-graphite component of claim 12 wherein the mixture contains five percent to ten percent by weight boric acid and one to two percent by weight silicic acid.

14. The method for making a carbon-graphite component of claim 13 wherein the mixture contains thirty percent to forty-five percent by weight phenolic resin.

15. A carbon-graphite component suited for use in an electrochemical cell made by the method which comprises:
- forming a precursor sheet structure comprising an inorganic compound containing boron and oxygen, a carbonizable, thermosetting resin and fibers selected from the group consisting of cellulose fibers, carbonized cellulose fibers and mixtures thereof;
- heating the sheet structure in a non-oxidizing atmosphere to a first temperature range which carbonizes cellulose fibers and the thermosetting resin wherein the carbonized resin bonds the carbonized cellulose fibers together;
- heating the sheet structure in a non-oxidizing atmosphere to a second, higher temperature range to increase the degree of graphitization of the carbonized cellulose fibers and resin.

16. The carbon-graphite component of claim 15 wherein the step of forming the precursor sheet structure includes the step of forming a mixture which comprises an inorganic compound containing boron and oxygen, an uncured, carbonizable, thermosetting resin and fibers selected from the group consisting of cellulose fibers, carbonized cellulose fibers and mixtures thereof and forming the precursor sheet structure from said mixture.

17. The carbon-graphite component of claim 16 wherein said thermosetting resin is a phenolic resin and the step of forming a precursor sheet structure includes the step of curing the thermosetting resin by heating the precursor sheet structure in an oxidizing atmosphere to a temperature which is less than the first temperature range and holding the mixture at said lesser temperature until the thermosetting resin is cured.

18. The carbon-graphite component of claim 17 wherein the fiber is selected from the group consisting of cotton fibers, carbonized cotton fibers and mixtures thereof.

19. The carbon-graphite component of claim 15 wherein the non-oxidizing atomsphere for heating the sheet structure to the first temperature range is nitrogen.

20. The carbon-graphite component of claim 18 wherein the method further includes the step of adding an amount of an inorganic compound of boron and oxygen to the precursor sheet structure after heating the precursor sheet structure to said first temperature range and prior to heating the precursor sheet structure to said second temperature range.

21. The carbon-graphite component of claim 16, claim 17, claim 18, or claim 19 wherein the inorganic compound of boron and oxygen is boric acid.

22. The carbon-graphite component of claim 16, claim 17, claim 18 or claim 19 wherein the uncarbonized fiber is heated to the first temperature range at a rate which exceeds one-hundred degrees Fahrenheit per minute and provides a carbon yield which is greater than twenty percent by weight of the uncarbonized fiber.

23. The carbon-graphite component of claim 22 wherein the mixture consists essentially of said fibers, said resin, and two percent to fifteen percent by weight of a flame retardant comprising said boric acid and a salt selected from the group consisting of ammonuim sulfate, ammonuim phosphate, ammonium sulfamate, borax and mixtures thereof.

24. The carbon-graphite component of claim 21 wherein the mixture comprises said resin, said fibers and two percent to fifteen percent by weight boric acid.

25. The carbon-graphite component of claim 24 wherein the mixture consists essentially of said resin, said fibers, said boric acid and silicic acid.

26. The carbon-graphite component of claim 25 wherein the silicic acid is present in an amount which is about fifteen percent to twenty-five percent by weight of the weight of the amount of said boric acid.

27. The carbon-graphite component of claim 26 wherein the mixture contains five percent to ten percent by weight boric acid and one to two percent by weight silicic acid.

28. The carbon-graphite component of claim 27 wherein the mixture contains thirty percent to forty-five percent by weight phenolic resin.

* * * * *